United States Patent
Kuzuya

(10) Patent No.: US 10,859,177 B2
(45) Date of Patent: Dec. 8, 2020

(54) ELECTRICALLY OPERATED GAS FLOW REGULATING VALVE

(71) Applicant: RINNAI CORPORATION, Aichi (JP)

(72) Inventor: Kotaro Kuzuya, Nagoya (JP)

(73) Assignee: RINNAI CORPORATION, Aichi (JP)

(*) Notice: Subject to any disclaimer, the term of this patent is extended or adjusted under 35 U.S.C. 154(b) by 0 days.

(21) Appl. No.: 16/708,842

(22) Filed: Dec. 10, 2019

(65) Prior Publication Data
US 2020/0232574 A1  Jul. 23, 2020

(30) Foreign Application Priority Data
Jan. 22, 2019 (JP) ................... 2019-008253

(51) Int. Cl.
*F16K 31/04* (2006.01)
*F16K 1/38* (2006.01)

(52) U.S. Cl.
CPC .............. *F16K 31/047* (2013.01); *F16K 1/38* (2013.01)

(58) Field of Classification Search
CPC ........ F16K 1/38; F16K 31/047; F16K 31/528; F16K 31/5245
See application file for complete search history.

(56) References Cited

U.S. PATENT DOCUMENTS

| | | | |
|---|---|---|---|
| 6,007,047 A * | 12/1999 | Phipps | F16K 31/528 251/129.01 |
| 6,923,427 B2 * | 8/2005 | Yonezawa | F16K 31/047 251/129.11 |
| 7,871,059 B2 * | 1/2011 | Nalini | F25B 41/062 251/129.11 |
| 9,657,656 B2 * | 5/2017 | Weldon | F16K 31/04 |
| 9,810,641 B2 * | 11/2017 | Sood | G01N 21/8422 |

FOREIGN PATENT DOCUMENTS

JP  2018-013274 A  1/2018

* cited by examiner

*Primary Examiner* — Eric Keasel
(74) *Attorney, Agent, or Firm* — Cermak Nakajima & McGowan LLP; Tomoko Nakajima

(57) ABSTRACT

An electrically operated gas flow regulating valve causes a needle valve body to move axially by the rotation of an electric motor through a motion conversion mechanism. The mechanism includes: a rotating body rotated by the electric motor; a cylindrical cam body prevented from rotating; a cam pin which is engaged with a spiral cam groove formed in the cam body and which is fixed to the needle valve body. The cam body is divided into two parts of a forward-side half part and backward-side half part with the cam groove serving as a boundary. The backward-side half part is urged by a coil spring in the forward direction such that the cam pin is pinched between the forward-side side edge of cam groove formed in the forward-side half part and the backward-side side edge of cam groove formed in the backward-side half part, thereby restraining the occurrence of hysteresis.

2 Claims, 4 Drawing Sheets

ELECTRICALLY OPERATED GAS FLOW REGULATING VALVE

This application claims priority under 35 U.S.C. § 119 to Japanese Patent Application No. 2019-008253, filed Jan. 22, 2019, which is incorporated by reference.

BACKGROUND OF THE INVENTION

1. Technical Field

The present invention relates to an electrically operated gas flow regulating valve including: a needle valve body moving axially toward, or away from, a valve seat inside a valve casing; an electric motor; and a motion conversion mechanism for moving the needle valve body axially by the rotation of the electric motor.

2. Related Art

As this kind of electrically operated gas flow regulating valve, there is known one in the related art in which the motion conversion mechanism is constituted by a cam mechanism provided with: a rotating body rotated by the rotation of an electric motor; a cylindrical cam body axially movable relative to the rotating body and also coupled to the rotating body so as to be rotatable; and a cam pin engaged with a spiral cam groove formed in the cam body, the cam pin being fixed to a needle valve body (see, for example, patent document JP 2018-13274 A). In this related art, the needle valve body is axially moveable, but is prevented from rotating, relative to the valve casing. Further, provided that the direction in which, out of the axial directions, the needle valve body moves toward the valve seat is defined as a forward direction and that the direction in which the needle valve body moves away from the valve seat is defined as a backward direction, the needle valve body is provided with: a stopper for stopping, at a predetermined position, the movement of the cam body in the forward direction; and an urging device for holding, under urged state, the cam body at the predetermined position. It is thus so arranged: that by the rotation of the electric motor in a normal rotating direction or in a reverse rotating direction through the rotating body, the cam body is rotated in the normal rotating direction or in the reverse rotating direction; that the needle valve body is moved in the forward direction by a forward-direction component of the contact force against the cam pin on the backward-side side edge of the cam groove, the contact force occurring by the rotation of the cam body in the normal rotating direction and further; that the needle valve body is moved in the backward direction by the backward-direction component of the contact force against the cam pin on the forward-side side edge of the cam groove, the contact force occurring by the rotation of the cam body in the reverse rotating direction. Even though the electric motor rotates in the normal rotating direction after further movement in the forward direction has been restrained as a result of the needle valve body coming into contact with the valve seat, the cam body moves in the backward direction against the urging force of the urging device by the backward-direction component of the contact reaction force against the cam pin on the backward-side side edge of the cam groove. As a result, the portion of contact (also referred to elsewhere as "contact portion") of the needle valve body with the valve seat can be prevented from getting scratched under the influence of an excessive force.

In the above-mentioned first related art example, the needle valve body is prevented from rotating relative to the valve casing, and the cam body is rotated together with the rotating body. But the following arrangement has also been conceived of, i.e., the needle valve body is arranged to be axially movable relative to the rotating body and is also coupled to the rotating body so as to be rotatable together, and the cam body is arranged to be prevented from rotating relative to the valve casing. In this second related art example, by rotating the electric motor in the normal rotating direction or in the reverse rotating direction, the needle valve body is rotated, through the rotating body, in the normal rotating direction or in the reverse rotating direction. The needle valve body is moved in the forward direction by a forward-direction component of a contact reaction force of the cam pin against a backward-side side edge of the cam groove, the contact reaction force occurring by the rotation, in the normal rotating direction, of the needle valve body. The needle valve body is moved in the backward direction by a backward-direction component of the contact reaction force of the cam pin against a forward-side side edge of the cam groove, the contact reaction force occurring by the rotation, in the reverse rotating direction, of the needle valve body.

By the way, in either of the above-mentioned first and the second related art examples, in order for the cam pin to be smoothly inserted into the cam groove, it is required that the distance between the forward-side side edge and the backward-side side edge of the cam groove be made slightly larger than the diameter of the cam pin. Therefore, there will occur a phenomenon in which the amount of gas flow differs, i.e., hysteresis occurs, even though the rotary phase of the electric motor is the same, the hysteresis occurring between: the time when the needle valve body is moved in the forward direction by contacting, with the cam pin, the backward-side side edge of the cam groove by the rotation in the normal rotating direction of the electric motor; and the time when the needle valve body is moved in the backward direction by contacting, with the cam pin, the forward-side side edge of the cam groove by the rotation in the reverse rotating direction of the electric motor.

SUMMARY

Problems that the Invention is to Solve

In view of the above points, this invention has a problem of providing an electrically operated gas flow regulating valve which is arranged to be capable of restraining the occurrence of hysteresis.

Means for Solving the Problems

In order to solve the above problem, this invention is an electrically operated gas flow valve comprising: a needle valve body axially toward, or away from, a valve seat inside a valve casing; an electric motor; a motion conversion mechanism for moving the needle valve body axially by rotation of the electric motor. The motion conversion mechanism includes: a rotating body rotated by the rotation of the electric motor; a cylindrical cam body prevented from rotating relative to the valve casing; a cam pin fixed to the needle valve body and being engaged with a spiral cam groove formed in the cam body. The needle valve body is movable axially relative to the rotating body and also is coupled to the rotating body so as to be rotatable together. Provided that a direction in which, out of axial directions, the needle valve body moves toward the valve seat is defined as a forward direction, that a direction in which the needle valve body moves away from the valve seat is defined as a backward direction, that a direction of rotation of the electric motor to move the needle valve body in the forward direction is defined as a normal rotating direction, and that a direction of rotation of the electric motor to move the needle valve body in the backward direction is defined as a reverse rotating direction. The motion conversion mechanism is so arranged: that, by rotating the electric motor in the normal rotating direction or in the reverse rotating direction, the needle valve body is rotated, through the rotating body, in the normal rotating direction or in the reverse rotating direction; that the needle valve body is moved in the forward direction by a forward-direction component of a contact reaction force of the cam pin against a backward-side side edge of the cam groove, the contact reaction force occurring by the rotation, in the normal rotating direction, of the needle valve body; and that the needle valve body is moved in the backward direction by a backward-direction component of the contact reaction force of the cam pin against a forward-side side edge of the cam groove, the contact reaction force occurring by the rotation, in the reverse rotating direction, of the needle valve body. The cam body is divided into two parts of a forward-side half part and a backward-side half part with the cam groove serving as the boundary, the forward-side side edge of the cam groove being formed in the forward-side half part, and the backward-side side edge of the cam groove being formed in the backward-side half part. The forward-side half part is incapable of moving axially relative to the valve casing and also is prevented from rotating. The backward-side half part is axially movable relative to the valve casing but is prevented from rotating. An urging device is disposed to urge the backward-side half part in the forward direction so that the cam pin is pinched between the forward-side side edge and the backward-side side edge of the cam groove. The urging force of the urging device is set to exceed the backward-direction component of the pressing force operated by the cam pin on the backward-side side edge of the cam groove when the needle valve body is moved in the forward direction while the needle valve body is being rotated in the normal rotating direction by the rotation of the electric motor in the normal rotating direction.

According to an aspect of this invention, in whichever rotating directions of the normal rotating direction and the reverse rotating direction the electric motor may be rotated, the cam pin will come into contact with both the forward-side side edge and the backward-side side edge of the cam groove. Therefore, in either of the case in which the needle valve body is moved in the forward direction by the rotation of the electric motor in the normal direction of rotation, and the case in which the needle valve body is moved in the backward direction by the rotation of the electric motor in the reverse direction of rotation, the position in the axial direction of the needle valve body will be the same with each other as long as the rotary phase of the electric motor is the same. The occurrence of hysteresis can thus be restrained.

In addition, even though the electric motor makes further rotation in the normal rotating direction after further movement in the forward direction has been inhibited as a result of contact of the needle valve body with the valve seat, due to the backward-direction component of the contact force of the cam pin against the backward-side side edge of the cam groove, the backward-side half part of the cam body moves in the backward direction against the urging force of the urging device. Therefore, the contact portion of the needle valve body with the valve seat can be prevented from getting scratched under the influence of an excessive force.

By the way, there are cases where the valve seat and the valve casing are formed not integrally with each other, but a member in which the valve seat has been formed is mounted inside the valve casing. In this case, it is preferable to form the forward-side half part of the cam body integrally with the member which has formed therein the valve seat. According to this arrangement, it is advantageous because, due to sharing (i.e., using in common) of the constituting parts, the number of the parts can advantageously be reduced.

PREFERRED EMBODIMENTS FOR CARRYING OUT THE INVENTION

Figure 1:
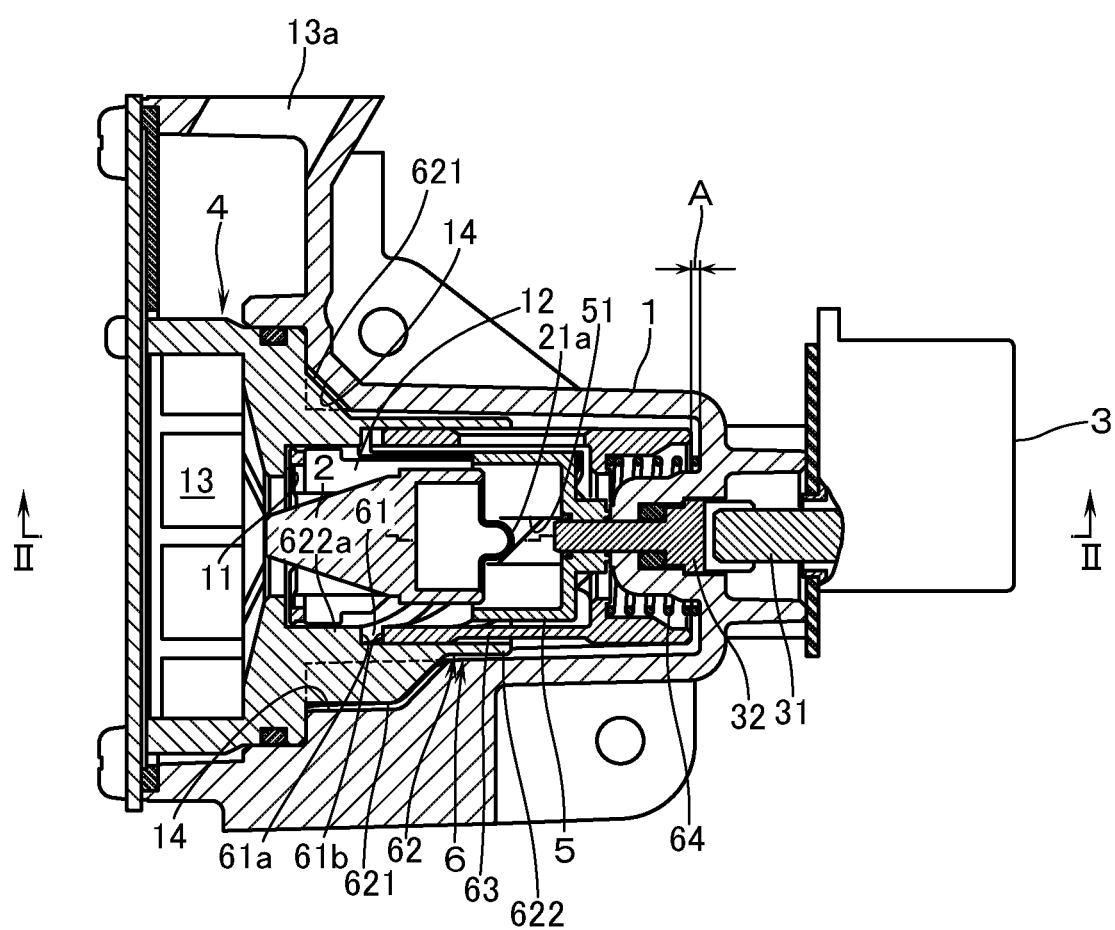
FIG. 1 is a sectional side view of an electrically operated gas flow regulating valve according to an embodiment of this invention.
Figure 2:
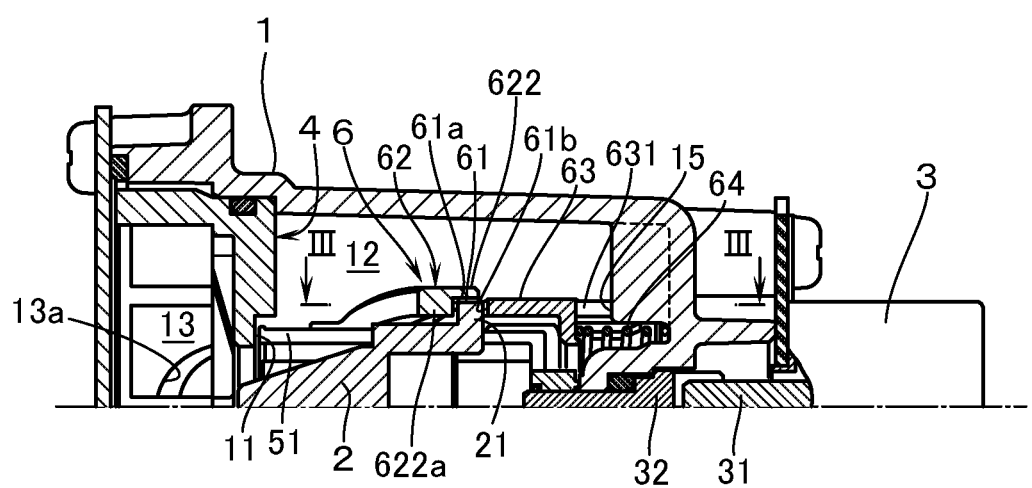
FIG. 2 is a sectional view of a half part sectioned along line II-II in FIG. 1.

With reference to FIGS. 1 and 2, an electrically operated gas flow regulating valve according to an embodiment of this invention has: a truncated-conical shape needle valve body 2 which moves axially toward or away from a valve seat 11 inside a valve casing 1; an electric motor 3; and a motion conversion mechanism which causes the needle valve body 2 to move axially by the rotation of the electric motor 3. Inside the valve casing 1, there are provided: a primary gas chamber 12 in communication with a gas inlet port (not illustrated); and a secondary gas chamber 13 in communication with a gas outlet port 13a. In this arrangement, the secondary gas chamber 13 has mounted therein a member 4 having formed therein the valve seat 11 for partitioning the primary gas chamber 12 from the secondary gas chamber 13.

Description will hereinafter be made provided: that a direction in which, out of the axial directions, the needle valve body 2 moves toward the valve seat 11 is defined as a forward direction; that a direction in which the needle valve body 2 moves away from the valve seat 11 is defined as a backward direction; that a direction of rotation of the electric motor 3 to cause the needle valve body 2 to move in the forward direction is defined as a normal rotating direction; and that a direction of rotation of the electric motor 3 to cause the needle valve body 2 to move in the backward direction is defined as a reverse rotating direction.

Figure 3:
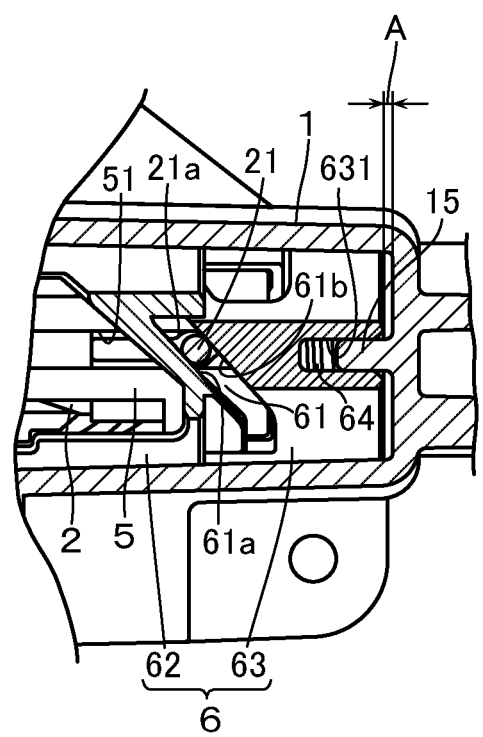
FIG. 3 is a sectional view sectioned along line III-III in FIG. 2.
Figure 4:
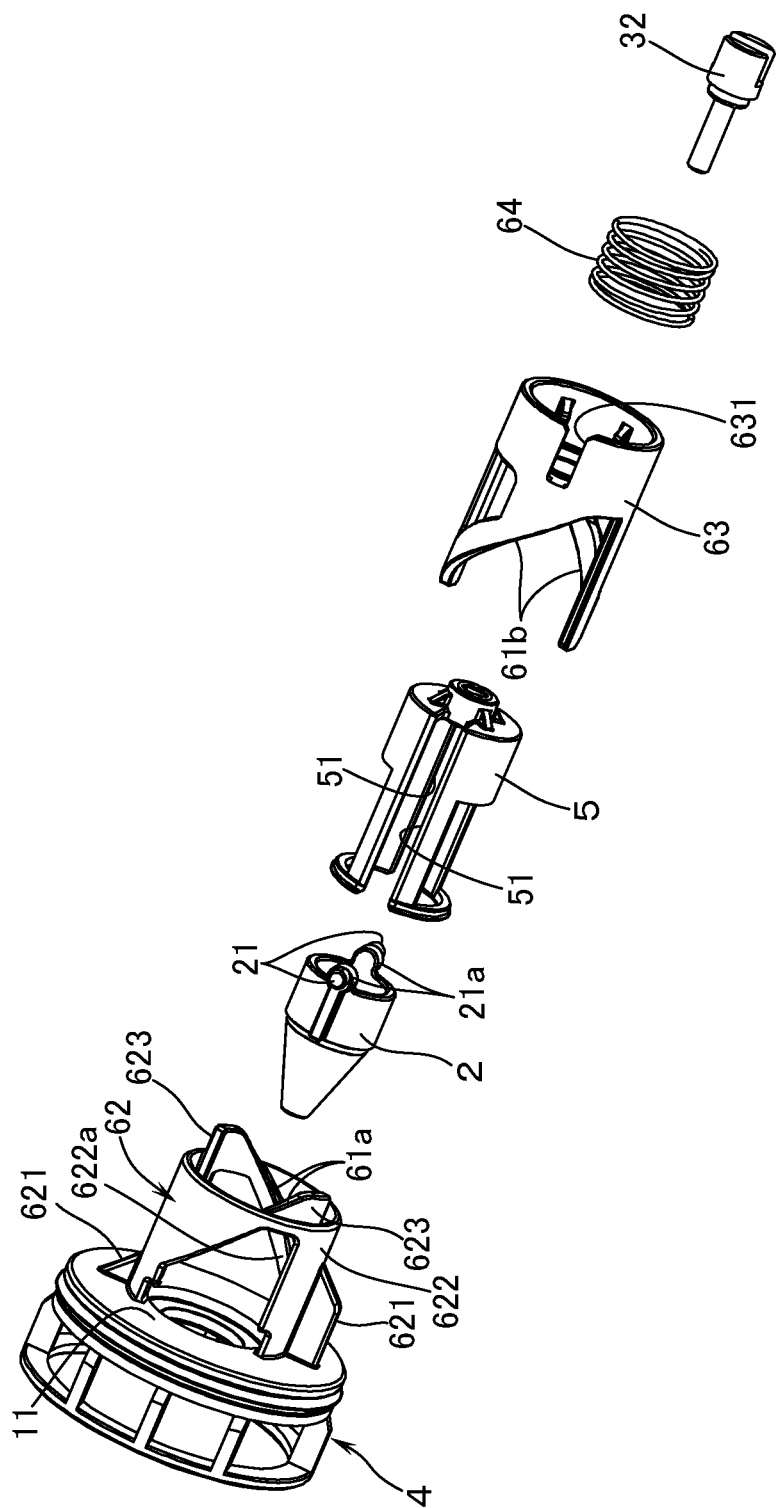
FIG. 4 is a perspective view in an exploded state of a motion conversion mechanism disposed in the electrically operated gas flow regulating valve of the embodiment.

With reference also to FIG. 4, the motion conversion mechanism is provided with: a cylindrical rotating body 5 which is connected, through a connector 32, to an output shaft 31 of the electric motor 3 so as to be rotated by the rotation of the electric motor 32; a cylindrical cam body 6 which is prevented from rotating relative to the valve casing 1; and a cam pin 21 which is fixed to the needle valve body 2 and is slidably engaged with a spiral cam groove 61 formed in the cam body 6. The cam pin 21 has formed at a base portion thereof large-diameter portion 21a. These large-diameter portion 21a is slidably engaged with axially elongated slits 51 formed in the rotating body 5. As a result, the needle valve body 2 is coupled to the rotating body 5 in a manner to be axially movable relative to the rotating body 5 and also in a manner to be rotatable together with the rotating body 5. The motion conversion mechanism is so constructed and arranged: that by rotating the electric motor 3 in the normal rotating direction or in the reverse rotating direction, the needle valve body 2 is rotated, through the rotating body 5, in the normal rotating direction or in the reverse rotating direction; that the needle valve body 2 is moved in the forward direction by a forward-direction component of a contact reaction force of the cam pin 21 against a side edge 61*b* on backward side of the cam groove (this side edge 61*b* is elsewhere referred to as "backward-side side edge 61*b* of the cam groove 61"). The contact reaction force occurs by the rotation of the needle valve body 2 in the normal rotating direction (i.e., in the direction in which the cam pin 21 moves upward in FIG. 3). The motion conversion mechanism is further so constructed and arranged that the needle valve body 2 is moved in the backward direction by a backward-direction component of the contact reaction force of the cam pin 21 against a side edge 61*a* on forward side of the cam groove 61 (this side edge 61*a* is elsewhere referred to as "forward-side side edge 61*a* of the cam groove 61"). The contact reaction force occurs by the rotation of the needle valve body 2 in the reverse rotating direction (i.e., in the direction in which the cam pin 21 moves downward in FIG. 3).

The cam body 6 is divided into two parts of a half part on forward direction side (also referred to elsewhere as "forward-side half part 62") and a backward direction side (also referred to elsewhere as a backward-side half part 63") with the cam groove 61 serving as a boundary. And the forward-side side edge 61*a* of the cam groove 61 is formed in the forward-side half part 62, and the backward-side side edge 61*b* of the cam groove 61 is formed in the backward-side half part 63. The forward-side half part 62 is incapable of moving axially relative to the valve casing 1, and is also prevented from rotating by bringing ribs 621 into engagement with grooves 14 formed on an inner circumferential surface of the valve casing 1, the ribs 621 having been formed in a manner projecting out of the peripheral surface of the forward-side half part 62. Further, the forward-side half part 62 has a peripheral wall portion 622 into which the backward-side half part 63 is inserted. The inner circumferential surface of the peripheral wall portion 622 has formed therein a thicker wall portion 622*a* and a protruding portion 623 which protrudes from the peripheral wall portion 622 in the backward direction in a manner to be continuous to the thicker wall portion 622*a*. The end edges, looking toward the backward direction, of the protruding portion 623 and of the thicker wall portion 622*a* constitute the forward-side side edge 61*a* of the cam groove 61. In order to reduce the number of constituent parts, the forward-side half part 62 is integrally formed with the member 4 that has formed therein the valve seat 11.

The backward-side half part 63 is axially moveable relative to the valve casing 1. In this arrangement, as will be described in detail hereinafter, in a state in which the cam pin 21 is pressingly pinched between the forward-side side edge 61*a* and the backward-side side edge 61*b* of the cam groove 61, there is a clearance A between the end edge in the backward direction of the backward-side half part 63 and the inner surface in the backward direction of the end wall portion of the valve casing 1. The backward-side half part 63 is therefore movable in the backward direction by the amount equivalent to the clearance A. In addition, the backward-side half part 63 is prevented from rotating relative to the valve casing 1 by bringing a rib 15 (see FIGS. 2 and 3) into engagement with an axially elongated notch 631, the notch 631 being formed in the backward-side end of the inner circumferential wall portion of the backward-side half part 63, the rib 15 being formed in a projecting manner in the backward-side end of the inner surface of the valve casing 1.

Further, in order for the cam pin 21 to be pinched, as shown in FIG. 3, between the forward-side side edge 61*a* of the cam groove 61 and the backward-side side edge 61*b* of the cam groove 61, there is disposed an urging device 64 made up of a coil spring that urges the backward-side half part 63 in the forward direction. The urging force of the urging device 64 is set to exceed the backward-direction component of the pressing force operated by the cam pin 21 on the backward-side side edge 61*b* of the cam groove 61 when the needle valve body 2 is moved in the forward direction while the needle valve body 2 is being rotated in the normal rotating direction by the rotation of the electric motor 3 in the normal rotating direction.

According to the above-mentioned arrangement, in whichever direction of rotation the electric motor 3 may be rotated in any of the normal rotating direction and the reverse rotating direction, the cam pin 21 will be in contact with both the side edges 61*a*, 61*b* on the forward side and on the backward side of the cam groove 61. Specifically, in a state in which the cam pin 21 is kept in contact with the backward-side side edge 61*b* of the cam groove 61 during the rotation of the electric motor 3 in the normal rotating direction so that the needle valve body 2 is moving in the forward direction, the cam pin 21 is in contact also with the forward-side side edge 61*a* of the cam groove 61. Similarly, in a state in which the cam pin 21 is kept in contact with the forward-side side edge 61*a* of the cam groove 61 by the rotation of the electric motor 3 in the reverse rotating direction so that the needle valve body 2 is moving in the backward direction, the cam pin 21 is in contact also with the backward-side side edge 61*b* of the cam groove 61. Therefore, in either case of moving the needle valve body 2 by the rotation of the electric motor 3 in the normal rotating direction, and the case of moving the needle valve body 2 in the backward direction by the rotation of the electric motor 3 in the reverse rotating direction, as long as the rotary phase of the electric motor 3 is the same with each other, the axial position of the needle valve body 2 will be the same with each other, thereby restraining the occurrence of hysteresis.

It is difficult, from the viewpoint of control, to instantly stop the rotation in the normal rotating direction of the electric motor 3 at the very moment of contact of the needle valve body 2 with the valve seat 11. Therefore, as a consequence of contact of the needle valve body 2 with the valve seat 11, further movement of the needle valve body 2 in the forward direction will once be restrained, but the electric motor 3 will keep on rotating slightly in the normal rotating direction. According to this embodiment, on the other hand, even though the needle valve body 2 has once come into contact with the valve seat 11 and then should the electric motor 3 further rotate in the normal rotating direction, due to the backward-direction component of the contact force of the cam pin 21 against the backward-side side edge 61*b* of the cam groove 61, the backward-side half part 63 of the cam body 6 will move in the backward direction against the urging force of the urging device 64. As a consequence, the contact portion of the needle valve body 2 with the valve seat 11 can be prevented from getting scratched under the influence of an excessive force on the contact portion.

Description has so far been made of an embodiment of this invention with reference to the drawings, but this invention shall not be limited to the above. For example, it is also possible to form the valve seat 11 integral with the valve casing 1. In this case, forward-side half part 62 of the cam body 6 that is independently separated from the valve seat 11 may be fixed to the inside of the valve casing 1. In addition, the needle valve body 2 may be engaged with the rotating body 5 in the form of spline mechanism so that the needle valve body 2 is axially movable relative to the rotating body 5 and also so that the needle valve body 2 can be rotated together with the rotating body 5.

EXPLANATION OF MARKS

1 valve casing
11 valve seat
2 needle valve body
21 cam pin
3 electric motor
4 member in which a valve seat is formed
5 rotating body
6 cam body
61 cam groove
61a forward-side side edge of cam groove (i.e., side edge on forward side of cam groove)
61b backward-side side edge of cam groove (i.e., side edge on backward side of cam groove)
62 forward-side half part (i.e., half part on forward side)
63 backward-side half part (i.e., half part on backward side)
64 urging device

What is claimed is:

1. An electrically operated gas flow regulating valve comprising: a needle valve body moving axially toward, or away from, a valve seat inside a valve casing; an electric motor; a motion conversion mechanism for moving the needle valve body axially by rotation of the electric motor, the motion conversion mechanism including: a rotating body rotated by the rotation of the electric motor; a cylindrical cam body prevented from rotating relative to the valve casing; a cam pin fixed to the needle valve body and being engaged with a spiral cam groove formed in the cam body, the needle valve body being movable axially relative to the rotating body and also being coupled to the rotating body so as to be rotatable together; provided that a direction in which, out of axial directions, the needle valve body moves toward the valve seat is defined as a forward direction, that a direction in which the needle valve body moves away from the valve seat is defined as a backward direction, that a direction of rotation of the electric motor to move the needle valve body in the forward direction is defined as a normal rotating direction, and that a direction of rotation of the electric motor to move the needle valve body in the backward direction is defined as a reverse rotating direction, the motion conversion mechanism being so arranged: that, by rotating the electric motor in the normal rotating direction or in the reverse rotating direction, the needle valve body is rotated, through the rotating body, in the normal rotating direction or in the reverse rotating direction; that the needle valve body is moved in the forward direction by a forward-direction component of a contact reaction force of the cam pin against a backward-side side edge of the cam groove, the contact reaction force occurring by the rotation, in the normal rotating direction, of the needle valve body; and that the needle valve body is moved in the backward direction by a backward-direction component of the contact reaction force of the cam pin against a forward-side side edge of the cam groove, the contact reaction force occurring by the rotation, in the reverse rotating direction, of the needle valve body;

the cam body being divided into two parts of a forward-side half part and a backward-side half part with the cam groove serving as a boundary, the forward-side side edge of the cam groove being formed in the forward-side half part, and the backward-side side edge of the cam groove being formed in the backward-side half part, the forward-side half part being incapable of moving axially relative to the valve casing and also being prevented from rotating, the backward-side half part being axially movable relative to the valve casing and being prevented from rotating;

an urging device disposed to urge the backward-side half part in the forward direction so that the cam pin is pinched between the forward-side side edge and the backward-side side edge of the cam groove, the urging force of the urging device being set to exceed the backward-direction component of the pressing force operated by the cam pin on the backward-side side edge of the cam groove when the needle valve body is moved in the forward direction while the needle valve body is being rotated in the normal rotating direction by the rotation of the electric motor in the normal rotating direction.

2. The electrically operated gas flow regulating valve according to claim 1, wherein the forward-side half part is formed integral with a member that has formed therein the valve seat to be mounted inside the valve casing.

* * * * *